United States Patent
Akiyama

(10) Patent No.: US 7,051,582 B2
(45) Date of Patent: May 30, 2006

(54) ACTUATING AND SENSING DEVICE FOR SCANNING PROBE MICROSCOPES

(75) Inventor: Terunobu Akiyama, Neuchatel (CH)

(73) Assignee: Institut de Microtechnique de l'Universite de Neuchatel, Neuchatel (CH)

( * ) Notice: Subject to any disclaimer, the term of this patent is extended or adjusted under 35 U.S.C. 154(b) by 213 days.

(21) Appl. No.: 10/477,253

(22) PCT Filed: Apr. 15, 2002

(86) PCT No.: PCT/CH02/00207

§ 371 (c)(1),
(2), (4) Date: Nov. 10, 2003

(87) PCT Pub. No.: WO02/093585

PCT Pub. Date: Nov. 21, 2002

(65) Prior Publication Data

US 2004/0159781 A1 Aug. 19, 2004

(30) Foreign Application Priority Data

May 11, 2001 (EP) .................................. 01810460

(51) Int. Cl.
*G01N 13/16* (2006.01)
(52) U.S. Cl. ........................................ 73/105; 250/306
(58) Field of Classification Search .................. 73/105; 205/306
See application file for complete search history.

(56) References Cited

U.S. PATENT DOCUMENTS

| 5,625,957 A | * | 5/1997 | Breyer et al. .................. 33/503 |
| 5,641,896 A | * | 6/1997 | Karrai .......................... 73/105 |
| 5,939,623 A | * | 8/1999 | Muramatsu et al. ........... 73/105 |
| 6,094,971 A | * | 8/2000 | Edwards et al. ............... 73/105 |
| 6,240,771 B1 | * | 6/2001 | Giessibl ........................ 73/105 |
| 6,515,274 B1 | * | 2/2003 | Moskovits et al. ......... 250/216 |
| 6,525,808 B1 | * | 2/2003 | Jackson et al. ............. 356/128 |

FOREIGN PATENT DOCUMENTS

EP  0 791 802  8/1997

OTHER PUBLICATIONS

"Resonant Sensors by Silicon Micromachining", Proceedings of the 1996 IEEE International Frequency Control Symposium, Jun. 5, 1996.

* cited by examiner

*Primary Examiner*—Daniel S. Larkin
(74) *Attorney, Agent, or Firm*—Rankin, Hill, Porter & Clark LLP

(57) ABSTRACT

An actuating and sensing device for scanning probe microscopes includes a tuning fork (21) containing two prongs, a connection device (23) such as a spring, and a probing tip (22). The tip (22) is connected to both prongs of the tuning fork (21) with the connection device (23). The tuning fork (21) is used as a mechanical resonator to vibrate. The movements of the prongs are transformed via the connection device (23) into movements of the tip (22), wherein the tip movements can be in different planes than the movement plane of the prongs.

19 Claims, 6 Drawing Sheets

ACTUATING AND SENSING DEVICE FOR SCANNING PROBE MICROSCOPES

BACKGROUND OF THE INVENTION

1. Field of the Invention

The present invention generally relates to the field of scanning probe microscopes and, more particularly, relates to an actuating and sensing device for scanning probe microscopes.

2. Description of Related Art

Microfabricated cantilever beams including a probing tip attached thereto are one of the main components of scanning probe microscopes (SPM), for example, atomic force microscopes (AFM). A measuring mode of an SPM is the so-called "dynamic" mode. In this mode, a tip is brought very close to a sample surface and the cantilever is vibrated with a frequency, which is close to its resonance frequency. In different measuring modes, for example so called "tapping" or intermittent contact modes, the tip is allowed to touch the surface as the cantilever vibrates. While a sample is scanned, the distance between the tip and features of the sample surface vary. This variation causes changes in the gradient of interaction forces, for example van der Waals forces, between tip and surface. The resulting changes in the mechanical characteristics of the cantilever, such as the resonance frequency, phase, vibration amplitude, and Q-factor, are detected with external systems, for example optical deflection detection systems. Usually, the distance between cantilever and sample surface is controlled by a feedback system to maintain the characteristics property at a constant value.

Cantilevers are typically vibrated by using a piezo slab attached to a cantilever chip. Spring constants k of conventional cantilever beams used in the tapping mode are usually k=1–100 N/m with resonance frequencies of 5–300 kHz. Low spring constant cantilevers are preferred because in that way the tip is less damaged or worn during operation. High resonance frequency cantilevers are preferred for high throughput or speed SPM measurements. As an example, it is difficult to use very soft cantilevers for dynamic mode measurements in air, e.g. with a spring constant with a value less than 0.1 N/m, if there is no sufficient vibrating amplitude provided, e.g. up to 1 μm. For example, water on a sample surface traps the tip to the surface without releasing it again. A piezo slab attached to the cantilever cannot effectively provide the tip with a sufficient excitation if the cantilever is vibrated at a frequency different from the first resonance frequency of the cantilever. The frequency of such a system, piezo slab and cantilever chip, is also not effective at higher frequencies than the first resonance frequency of the system.

In other implementations of SPMs, quartz tuning forks are used instead of microfabricated cantilevers. Tuning forks are electrical components that were mainly developed for electronic circuits. They are small mechanical resonators of a few mm in size and have a very high Q-factor, i.e. they are very sensitive to applied forces. The relatively easy accessibility to their resonance characteristics, for example by measuring the electrical conductance, make tuning forks attractive candidates for SPM applications. In SPM applications using a tuning fork, an SPM tip is attached to one prong of the tuning fork. The tip is attached either sideways or on top of the prong as disclosed, for example, in the documents U.S. Pat. No. 6,094,971 and EP 0 864 846. The disadvantages of such cantilever systems arise from the fact that the tips are fixed directly to one prong of the tuning fork. The symmetry of the tuning fork is broken. This reduces the mechanical Q-factor and makes it less sensitive to applied forces. Further, the vibration amplitude of the tip is always the same as that of the tuning fork itself. In addition, these probes are very stiff compared to conventional microfabricated cantilevers, i.e. tips are easily damaged during operation. Typical spring constants of prongs of tuning fork resonators are 1.8 kN/m with a resonance frequency of about 30 kHz.

SUMMARY OF THE INVENTION

It is an object of the invention to provide an actuating and sensing device for scanning probe microscopes overcoming drawbacks of existing scanning probe microscopes, especially of scanning probe microscopes using tuning fork resonators.

It is a further object of the invention to provide an actuating and sensing device, which includes a tuning fork and a microfabricated cantilever.

It is a further object of the invention to provide a symmetric actuating and sensing device that enhances Q-factor and/or resonance frequency of state of the art tuning fork resonators.

The actuating and sensing device of the present invention includes a fork-like device including two prongs, e.g. a tuning fork, and connection means with a probing tip, wherein the tip is connected to both of the two prongs of the fork-like device via the connection means. The fork-like device is used as a mechanical resonator to vibrate. The movements of the prongs are transformed via the connection means into movements of the probing tip, wherein the tip movements can be in different planes than in a movement plane of the prongs. The actuating and sensing device is preferably used in scanning probe microscopes (SPM), e.g. atomic force microscopes.

One advantage of a tip being connected to two prongs of a tuning fork is that the symmetry of the tuning fork can be maintained. In this way the Q-factor of the tuning fork can be much higher than that of a state of the art tuning fork SPMs and, therefore, the tuning fork is much more sensitive to applied forces.

The tip can be connected to the prongs of the tuning fork using flexible and elastic connection means, such as spring means like plate or leaf springs, resilient elastic pieces of sheet materials, foils, or wires. The small mass of the connection means added to the tuning fork tends to decrease the resonance frequency of the tuning fork. This also occurs in the case of state of the art tuning fork SPMs. However, in the present invention, the connection means gives an additional stiffness to the tuning fork and enhances the resonance frequency of the tuning fork. This effect is much more pronounced compared to that of the additional mass. Therefore, the resonance frequency of the tuning fork becomes higher than the original value, which is preferred for example in high speed SPMs. The system properties can be noticeably improved by using a tuning fork with attached connection means.

In the present invention the movements of the prongs of a tuning fork cause movements of the connection means. While the tuning fork is vibrated at a frequency the connection means is vibrated at the same frequency. Large vibration amplitudes of the connection means, e.g. spring means, are obtained also when the connection means are vibrated at higher frequencies than their first resonance frequency. As an example, if the first resonance frequency of a tuning fork is 50 kHz and the resonance of the spring means (a plate spring) is 8 kHz, the plate spring can be vibrated at 50 kHz with a vibration amplitude of, for example, 500 nm at its free end. The resonance frequency of the connection means needs not be the same as that of the tuning fork and can be chosen according to the needs of the user. This is not possible in state of the art SPMs. There the cantilever or tuning fork is vibrated with a frequency that is close to its resonance frequency. Reasonably large vibration amplitudes of the cantilever or prong can only be obtained around the first resonance frequency of the cantilever or tuning fork, respectively.

In the present invention, the connection means preferably have a shape with at least one axis or plane that is essentially a symmetry axis or plane of the connection means. Preferably, the connection means has one or more axis of symmetry and the tip lies on at least one of these symmetry axis. It is especially preferable if a symmetry axis of the connection means lies in or is parallel to a symmetry axis or plane of the tuning fork. With a symmetric arrangement of connection means, tip, and tuning fork, the complete symmetry of the cantilever beam is maintained. This not only enhances the Q-factor of the tuning fork but also simplifies the movements of the tip in that one degree of freedom out of three is limited so that the tip moves in a plane.

In an embodiment of the present invention, the tip is connected to the tuning fork in at least three points: first connection points on or at the two prongs of the tuning fork and a further connection point. This further connection point is preferably located at the base of the tuning fork, e.g. on a symmetry axis or plane of the fork. A further connection of the tip with the tuning fork can, for example, be used as coupling means for the tip to an external source or unit. A coupling means can, for example, be an optical or electrical coupling location. The electrical coupling location is, for example, a contact point for a voltage to be applied to the tip by an otherwise electrically isolated tip and preferably independent of any driving signal of the tuning fork. The coupling means can also be used, for example, for an optical coupling of light into or out of an actuating and sensing device as can be used in a scanning near field optical microscope (SNOM). A connection means having at least a further connection point is designed accordingly, preferably in a way to keep the symmetry of the tuning fork.

Tuning fork, connection means, and tip can be one single or separate parts of a scanning probe device. According to an embodiment of the present invention, a tip and the connection means are one part, i.e., fabricated out of one block of material in one or several processing steps as is well known in microtechnology. However, a tip can also be part of a connection means in a way that the connection means itself serves as probing tip. The connection means are then provided with a sharp edge or corner. This can, for example, be achieved by shaping the connection means as a triangle. However, a probing tip can also be glued or attached to a connection means by any suitable fixing technique. Conventionally available tuning forks like quartz or piezoelectric tuning forks, are usually covered by a metallic layer, e.g. a gold layer that serves as electrical contact. Therefore, the connection means may also be attached to the tuning fork by other fixing techniques, for example, by welding or bonding. Preferably, piezoelectric tuning forks are used, e.g. quartz tuning forks as used in watch applications. Depending on the material used to fabricate the actuating and sensing device, the tuning fork is not piezoelectric. This can, for example, be the case when tuning fork, connection means, and tip are made of the same material, e.g. fabricated from one block of material such as silicon. In that case, the tuning fork can at least partially be covered with a piezoelectric layer. For tuning forks that contain semiconductor or conductor materials, it is possible to generate a movement of the prongs by applying electrostatic forces to the prongs. This can, for example, be realized by placing counter electrodes near the prongs to form a capacitor and apply a potential between the prongs and the electrodes.

In SPM measurements, the tuning fork is resonated. Due to interaction forces between tip and sample surface changes in the mechanical characteristics of the tuning fork, e.g. resonance frequency, phase, vibration amplitude and Q-factor, or changes of the connection means, e.g. mechanical or positional changes, are occurring and are detected. As power source for a piezoelectric tuning fork resonator a current or voltage signal is applied to the tuning fork and a movement of the prongs is generated. For different kinds of tuning forks, e.g. electro-magnetically resonated tuning forks or conventional metal tuning forks, suitable power sources have to be chosen. Direct and indirect ways are possible for the detection of changes in mechanical characteristics of the tuning fork or for changes of the connection means. In a direct way the internal signals from the tuning fork are measured, e.g. a change in the electrical conductance of the tuning fork is sensed. In an indirect way external detection systems are used, such as optical deflection detection systems that detect changes of the position of a connection means due to the interaction of a tip with a sample surface.

Connection means according to the present invention are preferably designed as spring means, such as plate springs or resilient stripes of solid material. These spring means can have spring constants with values lower than 0.1 N/m. Typical values of spring constants in experimental set-ups lie in a range of 0.03–80 N/m and preferably in a range of 0.04–30 N/m, e.g. 0.07 N/m. This is much lower than spring constants of state of the art tuning fork resonators that have values around 2 kN/m. It is even lower than typical spring constant values of 1–100 N/m of conventional silicon cantilevers. The cantilever system of the present invention is therefore much softer than state of the art cantilevers, and the tips are less often damaged during operation.

BRIEF DESCRIPTION OF THE DRAWINGS

In the following, preferred embodiments of the invention are described with reference to drawings, wherein.

DETAILED DESCRIPTION OF THE PREFERRED EMBODIMENTS

Figure 1:
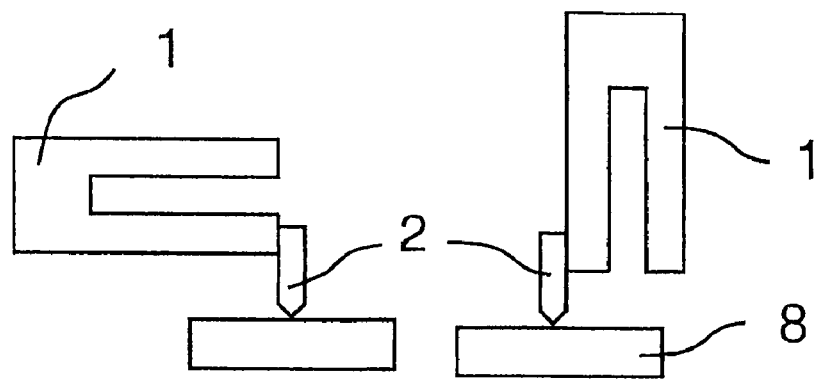
FIG. 1 schematically shows state of the art tuning forks including a probing tip.

FIG. 1 shows two examples of state of the art tuning forks 1 as used in SPM applications. A tip 2 is fixed to one prong of a tuning fork 1, either perpendicular to the tuning fork, as shown on the left-hand side of the drawing or parallel to it as represented on the right-hand side. The tip 2 is directly coupled to the tuning fork and always moves in the same direction as the prong. In the latter case, the tip movement is almost parallel to a sample surface 8.

Figure 2:
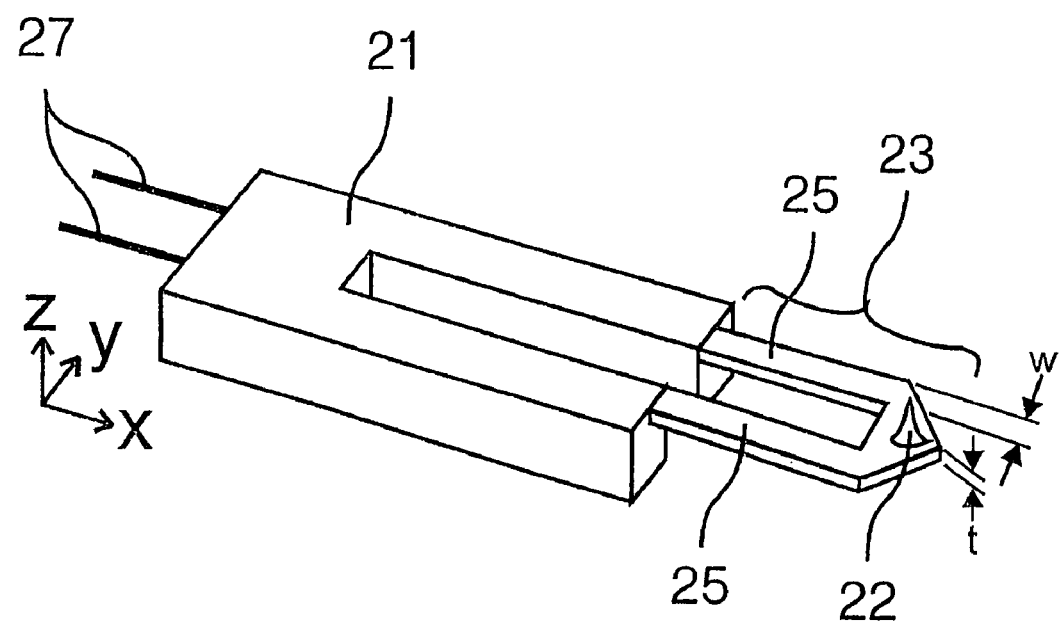
FIG. 2 is an oblique view of an embodiment of an actuating and sensing device according to the present invention.

A first preferred embodiment of the present invention, to be seen in FIG. 2, comprises as a spring means a U- or V-shaped plate spring 23. The plate spring 23 is, for example microfabricated metal, monocrystalline silicon, silicon oxide, silicon nitride, or polymer. Each of the two legs 25 of the plate spring 23 is fixed, such as by gluing or bonding, to different prongs of a piezoelectric tuning fork resonator 21. The tip 22 is preferably part of the plate spring 23, and is manufactured in the same process as the plate spring 23. The tip 22 can also be fixed, e.g. glued, to the plate spring 23 and points into a direction, the z-direction, perpendicular to the plane the tuning fork and plate spring lie in, the xy-plane. The tip 22 lies in the symmetry plane of the tuning fork-plate spring system, i.e. the xz-plane. The tuning fork 21, being piezoelectric and being connected to electrodes 27, mainly vibrates in the xy-plane. The tip 22 is forced to move mainly along the z-axis or rather in the xz-plane. The tip 22 does not move in the same direction as the prongs do, which is different to conventional SPMs using tuning forks. The thickness t of the legs 25 of the plate spring is smaller than the width w in order to allow a flexible movement of the tip 22 into −z and +z direction. If there is any interaction occurring between the tip and a sample, i.e. by scanning over a sample surface, the resonance characteristics, such as the resonance frequency, phase, vibration amplitude, and Q-factor of the tuning fork resonator 21 are changed. These characteristics are preferably detected using the same electrodes 27, for example by measuring the electrical conductance or conduction changes in the tuning fork resonator.

The sizes of length, width, thickness of prong, plate spring or tip all lie in a submicrometer or micrometer range, typically ranging from 0.5 μm to several thousands of micrometers. Typical prong lengths are 500–4500 μm with preferred values of 1500–3500 μm. The prong thickness tp and width wp lies typically between 50–350 μm, with preferred values for wp=150–280 μm and tp=80–200 μm. A length of a plate spring is typically in between 150 μm and 1000 μm, with preferred values of 250–650 μm. Values for w and t, width and thickness of the plate spring, lie typically in a range of about 0.1–150 μm, where w lies preferably between 30 μm and 100 μm, is for example 65 μm. The thickness t has a preferred value of 0.1 μm to 20 μm, e.g. 1 μm. It has to be mentioned that all sizes are adapted to users needs or technical problems, i.e. sizes may be smaller or larger than the given exemplary ranges.

Figure 3:
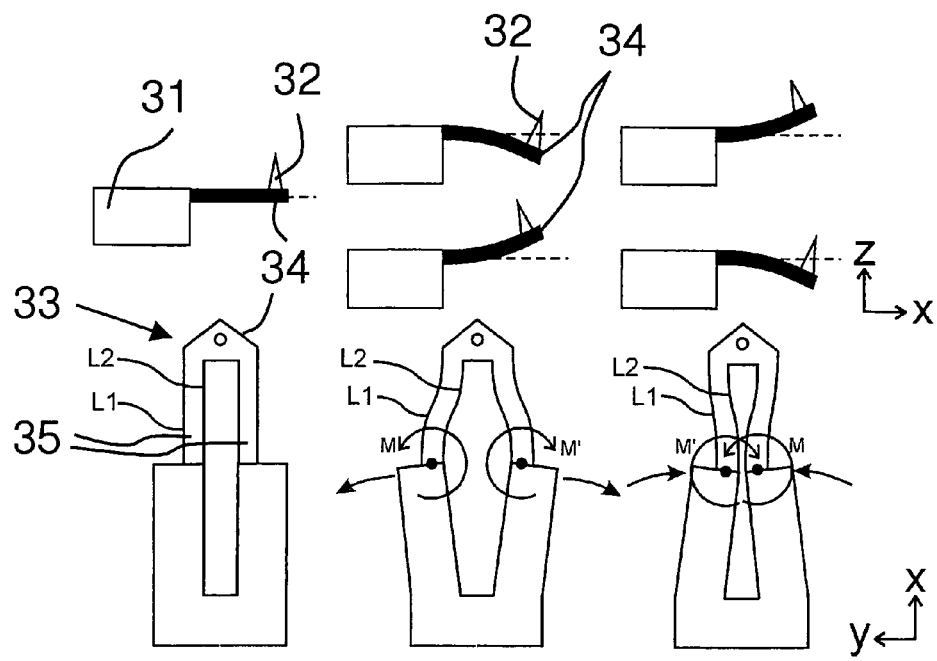
FIG. 3 represents a side view and a top view of the working principle of the embodiment of FIG. 2.
Figure 4:
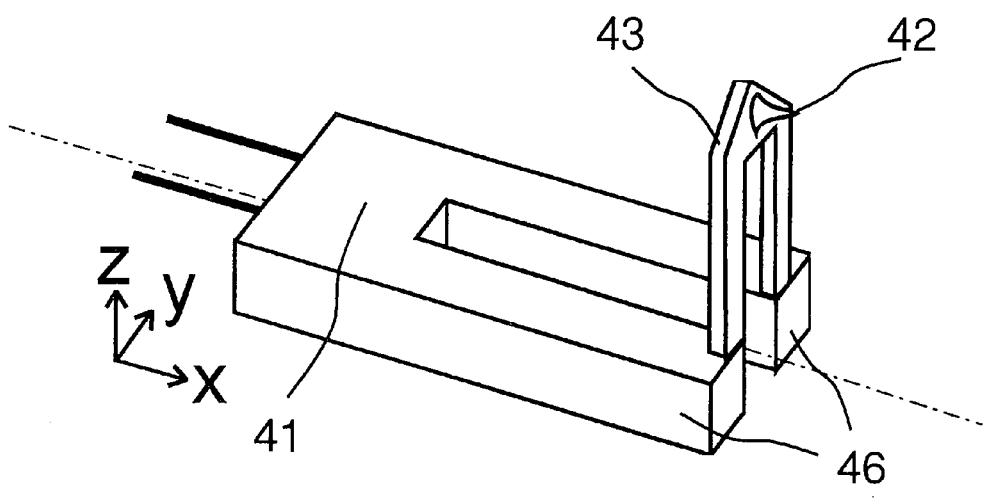
FIG. 4 sketches a second embodiment according to the present invention.
Figure 5:
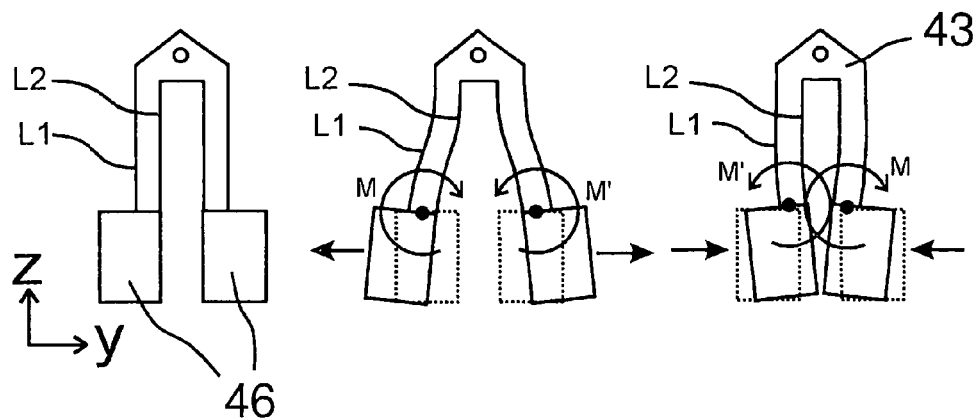
FIG. 5 illustrates the working principle of the embodiment of FIG. 4.

FIG. 3 shows working principles of an actuating and sensing probe as described in FIG. 2. Resonation of the tuning fork 31 results in a movement of the prongs mainly in a xy-plane what can be seen in the lower part of FIG. 3, which shows top views of the actuating device. The movement of the prongs results in angular momentums M and M' affecting each leg 35 of the plate spring 33. The two sides L1 and L2 of a leg 35 are therefore subject to different amounts of mechanical stress. To accommodate the stress distribution, the plate spring deforms in a way that the spring head 34 and therefore the tip 32 comes out of the xy-plane. The movement of the tip is therefore mainly in the xz-plane, which can be seen in the upper part of FIG. 3 in side views of the actuating device. If, for example, an AC electrical signal is applied to the piezoelectric tuning fork resonator 31, the two prongs resonate with anti-phase and deform the attached plate spring 33. The tip 32 in this case does not move in the same direction as the tuning fork vibration direction. Preferably, the vibration frequency of the plate spring 33 is the same as the resonance frequency of the tuning fork resonator 31. However, it can be chosen according to the users needs. In FIG. 4, a U- or V-shaped plate spring 43 is perpendicularly attached to the prongs of a tuning fork 41, i.e. the plate spring lies in a yz-plane, while the tuning fork 41 lies in the xy-plane. The tip 42 is incorporated in or fixed to the head of the plate spring 43 to lie parallel to the symmetry axis, i.e. the x-axis of the tuning-fork 41. When the tuning fork 41 is resonated, the tip 42 on the plate spring 43 moves mainly on the x-axis or in the xz-plane, respectively. The twisting movement of the prongs 46 of the tuning fork 41 is shown in FIG. 5. Similar to FIG. 3, the movement of the prongs 46 cause angular momentums M and M' on the legs of the plate spring. Due to these angular momentums the two sides L1, L2 of each leg undergo different amounts of mechanical stress and therefore bend. The bending of the legs results in a movement of the tip in the xz-plane. Due to a different geometric arrangement of tuning fork, plate spring, and tip, the position of the actuating and sensing device relative to a scanned surface is changed compared to the actuating device shown in FIG. 2.

Figure 6:
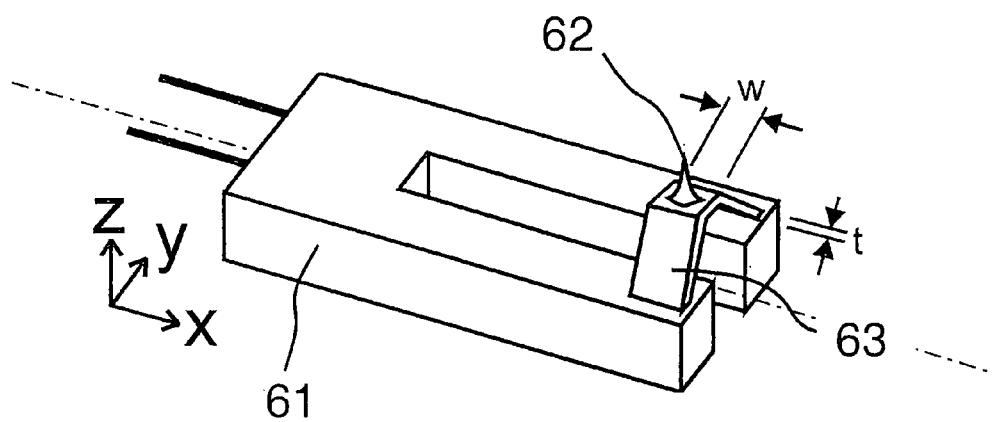
FIG. 6 shows a third embodiment according to the present invention.
Figure 7:
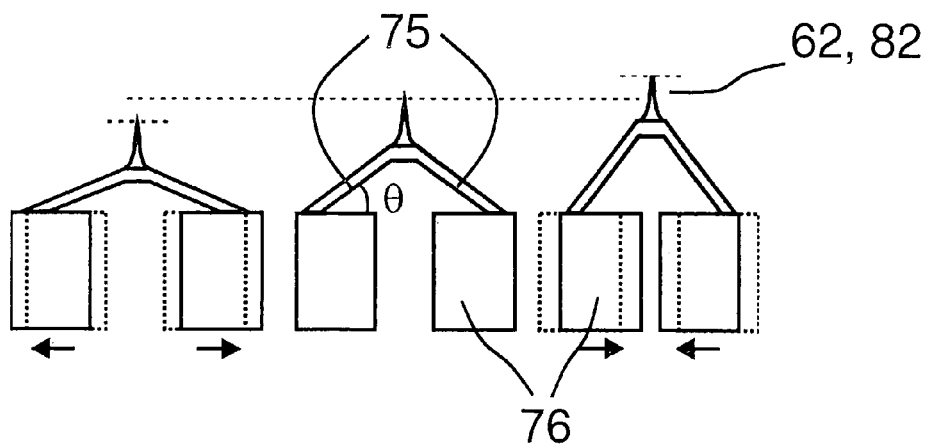
FIG. 7 illustrates the working principle of the embodiment of FIG. 6.
Figure 8:
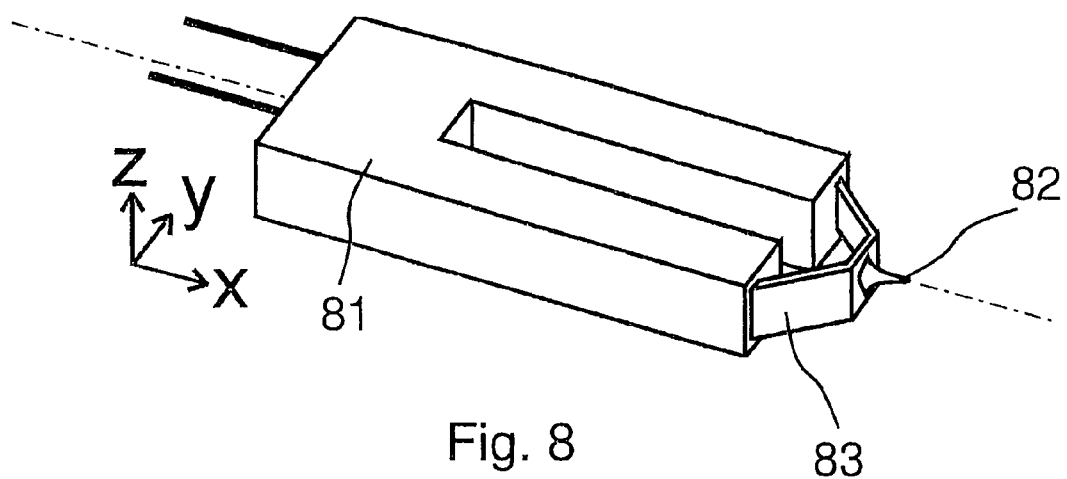
FIG. 8 shows a fourth embodiment according to the present invention.

FIGS. 6 and 8 show further embodiments of the present invention. A connection means is an elastic stripe of solid material, such as a metal, monocrystalline silicon, silicon nitride, silicon oxide, or a polymer strip. The stripe forms a bridge 63, 83 and is attached, e.g. glued, to the different prongs of a tuning fork 61, 81. In both embodiments, the tip axis, defined by the pointing direction of the tip 62, 82, lies on or is parallel to the symmetry plane of the strip 63, 83 that forms the bridge. In these embodiments, the tip moves on an axis. In FIG. 6, a defined axis of the bridge is the z-axis and the symmetry plane is the yz-plane. The bridge 63 is arranged perpendicularly to the tuning fork's 61 symmetry plane, which is also the plane the tuning fork lies in. In FIG. 8, the defined direction of the bridge 83 is the x-axis and the symmetry plane is the xy-plane. The bridge lies in or is arranged parallel to the tuning fork's 81 symmetry plane. While the tuning fork 61, 81 is vibrated, the tip 62, 82 is closer to or further away from the prongs 76, as can be seen in FIG. 7. With this movement a tip can be approached to a sample surface and/or a surface can be scanned. The variation of the angle Θ between tuning fork prong 76 and leg 75 of the bridge indicates either a sideways extension of the bridge as shown on the left-hand side of the drawing, or a forward extension as can be seen on the right-hand side of the drawing. For an optimal flexibility of the strip 63, its width w and thickness t (FIG. 6) are correspondingly chosen, i.e. t smaller or equal than w. Values for w and t lie preferably in a range of about 0.1–150 μm, where w lies typically between 30 μm and 100 μm, is e.g. 65 μm. The thickness t typically has a value of 0.1 μm to 20 μm, is e.g. 1 μm. The distance between the ends of the two legs of the strip 63 is adjusted to the separation distance of the prongs and has preferably a value of several hundreds of micrometers. Typical values lie in a range of 150–650 µm, e.g. 440 µm.

Figure 9:
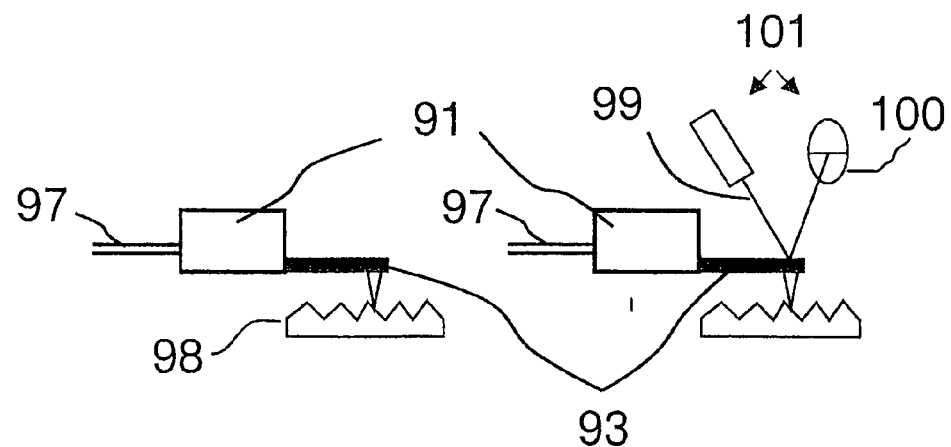
FIG. 9 shows a scheme of detection systems used in the present invention.

In FIG. 9, two detection principles that can be used in the present invention are shown. The tuning fork 91 can be used as an actuating and sensing means with a direct way of detection as shown on the left-hand side of the drawing. It can also be used as an actuating means only with an indirect way of detection as can be seen on the right-hand side of the drawing. In the first case, the resonance characteristics of the tuning fork 91 are detected via electrodes 97, for example, by measuring changes in the electrical conductance, in the vibration amplitude, or in the mechanical Q-factor of the tuning fork around its resonance frequency. In the second case, the tuning fork is mainly used to vibrate the attached spring means, i.e. the plate spring 93 including the tip. With an external optical detection system 101, optical signals are detected, for example, with photodiodes 100. The signals are deflected due to changes in the plate spring position relative to reference positions. The deflection measurements are preferably done by an optical signal, e.g. a laser beam 99, that is reflected from the back side of the plate spring 93: changes in the plate spring position cause deflection of the light beam into different directions.

To achieve topographic images of a sample surface 98, the sample or the tuning fork is moved in a plane parallel to the sample surface, i.e. the xy-plane as shown in FIG. 2 by a scanner, while the tip is engaging the sample surface 98.

A tip-sample separation, i.e. a movement in z-direction (see FIG. 2), can be done either by the scanner or the tuning fork. When a SPM operates in the constant force mode, the tuning fork can be used to control the tip-sample separation. Since the resonance frequency of the tuning fork is substantially higher than that of conventional piezoelectric scanners, much higher scan rates can be achieved. When the SPM operates in the dynamic or intermittent contact mode, a superimposed AC-DC signal can be applied to the tuning fork, and the latter is typically used to vibrate the connection means as well as to control the tip-sample spacing (z-feedback actuation).

Figure 10A:
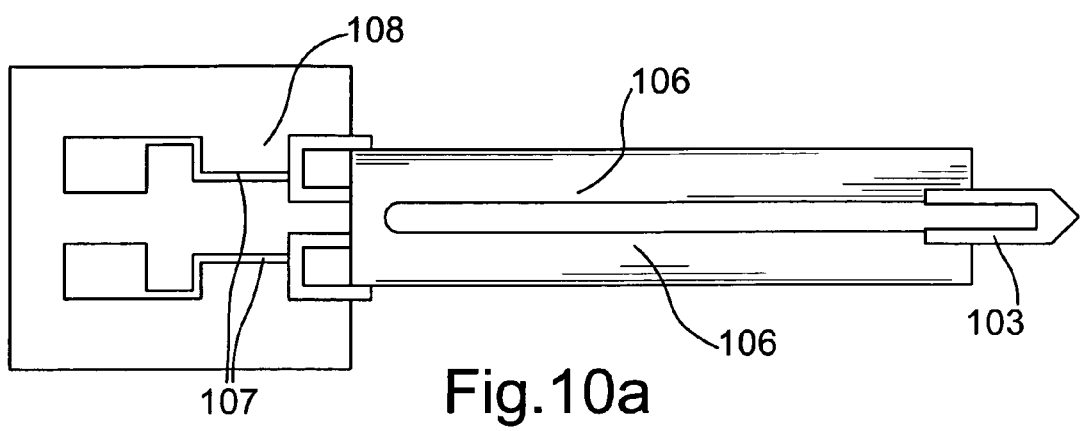
FIGS. 10a and 10b show an experimental set-up according to the embodiment of FIG. 2 and an enlargement of the connection means region.
Figure 10B:
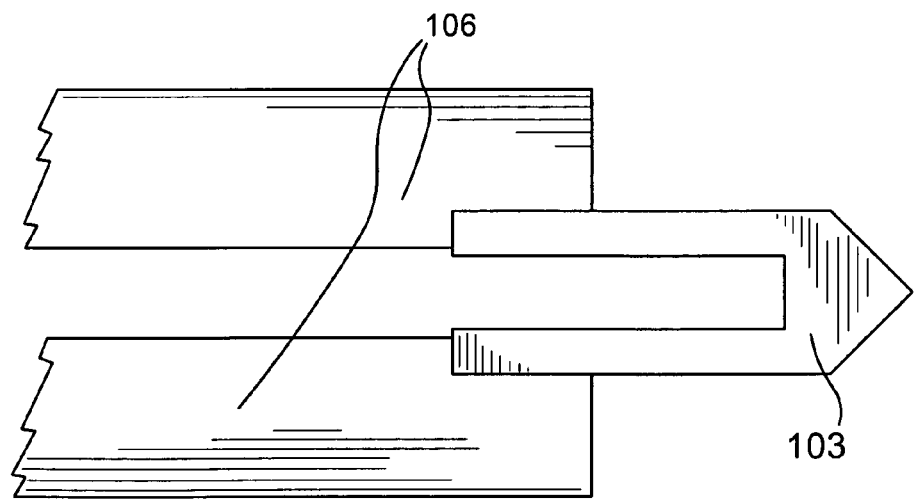

FIGS. 10a and 10b show an experimental set-up of an actuating and sensing device and an enlarged view of the plate spring section. Two prongs 106 are attached to a base 108 and form a tuning fork. A spring means 103 formed as a plate spring is attached with each of its two legs to the prongs 106 of the tuning fork. Electrical contacts 107 that serve as electrodes are connected to the, for example, gold covered prongs 106 and to a control unit. The tuning fork, e.g. a quartz tuning fork, is controlled and measurement signals are detected with a control and detection unit that can be integrated in a chip in the base 108.

Exemplary sizes and values of an experimental set-up as shown in FIG. 10a and FIG. 10b are:

for the prong: 2400 µm length, 130 µm thickness, 21.4 µm width;

for the connection means: 437 µm length, 1 µm thickness; 65 µm width of legs;

for the tip height: 10 µm; and, with a silicon nitride plate spring 103 with a spring constant in z-axis direction, i.e. out of plane direction, of $k=0.066$ N/m.

Figure 11:
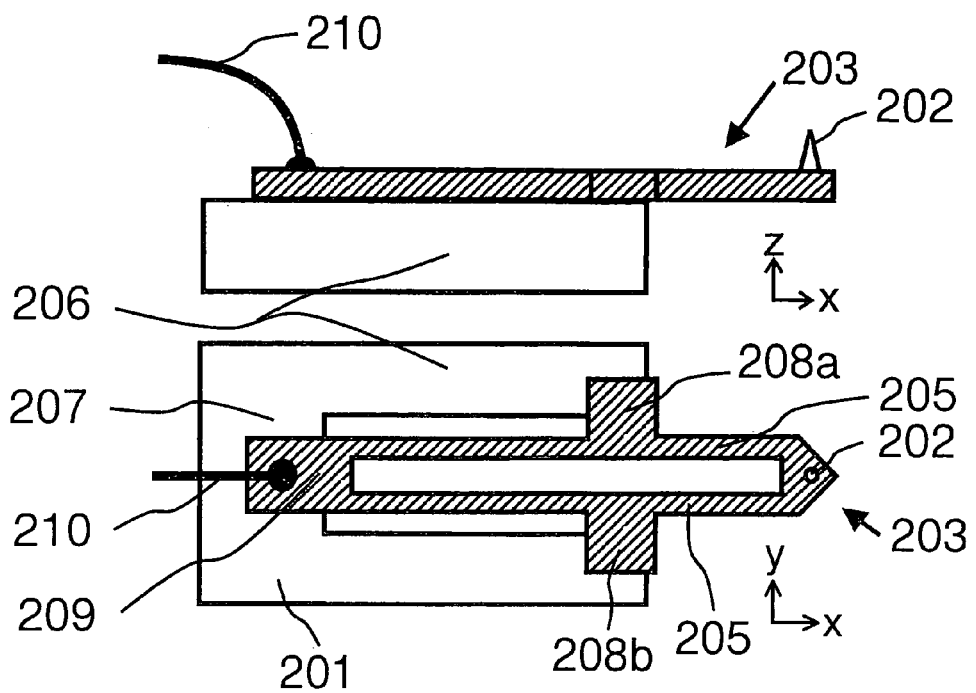
FIG. 11 shows a fifth embodiment of the present invention.

FIG. 11 represents a top and side view of an actuating and sensing device, wherein the tip 202 is connected to the tuning fork 201 via the connection means 203 in three points. The connection means, with its front part formed as a U- or V-shaped plate spring 203, is attached (glued or bonded) to the different prongs 206 of the tuning fork 201 and additionally to the base 207 of the tuning fork 201. The front part of the plate spring 203 with the tip 202 is designed and can be moved in the same manner as described in the first embodiment in FIG. 2. The legs 205 of the spring plate 205 each comprise first connection points formed as enlarged areas 208a,b, with which the legs are attached to one prong each. With a further connection point the legs are attached to the base 207 of the tuning fork. This further connection point is also formed as an enlarged area 209 connecting the legs 205 but without preventing the movement of the prongs 206. The plate spring 203 is electrically isolated from the tuning fork, with the tip electrically connected to the rear part of the plate spring 203. This is preferably realized by an electrically conducting plate spring. An electrical contact, e.g. a wire 210, is attached to the further connection point. Through the electrical contact a potential can be given to the tip without any interference from a driving signal (not shown) for the tuning fork.

Connection means can also be shaped in a way that movements of the tip can be performed according to, for example, the embodiments shown in FIG. 4 or 8, i.e. mainly in an x-direction. This can be realized by attaching the legs 205 to the inside of the prongs, forming first connection points. Elongated parts of the legs then head toward the base 207 of the tuning fork, where they are preferably combined and fixed to the base in a further connection point. With a symmetric design of the connection means, especially a further connection point attached to the base of the tuning fork, the Q-factor of the actuating and sensing device is not significantly altered. However, also an asymmetric placement of the further connection point and therefore an asymmetric connection means can be chosen, as well as the further connection point being combined with a first connection point.

Figure 12:
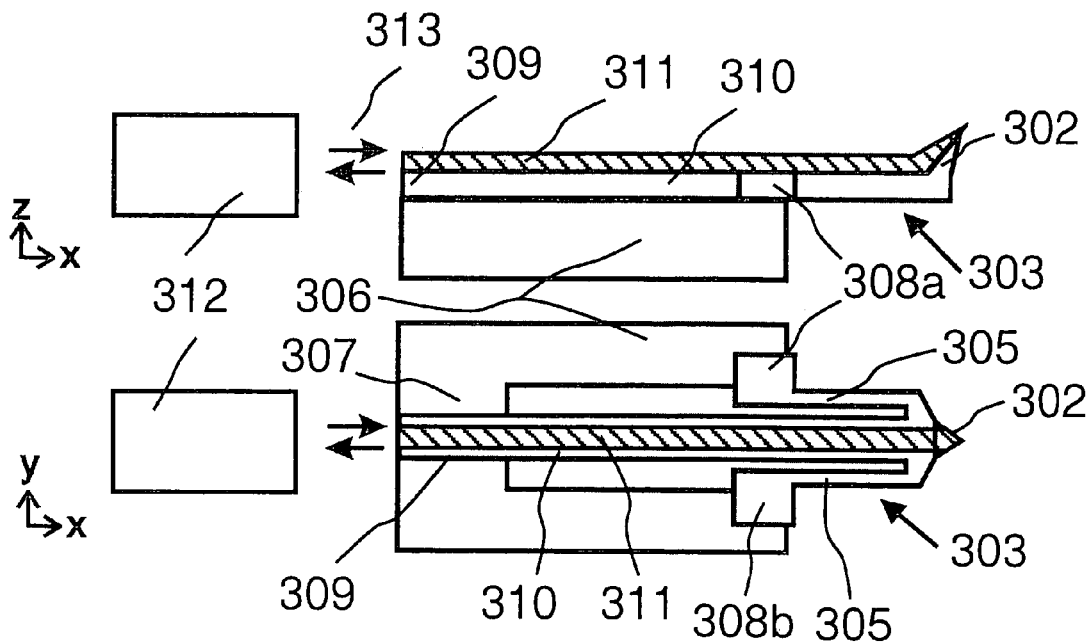
FIG. 12 shows a sixth embodiment of the present invention.

In FIG. 12, a top and side view of another embodiment of an actuating and sensing device with the tip 302 connected to the tuning fork in three points is shown. This embodiment is especially designed for the use in a scanning near field optical microscope or any microscope where a direct and/or straight connection from the base of a tuning fork to the tip 302 is needed or preferred. A front part of the connection means, formed as a U- or V shaped plate spring 303, is in general designed and can be moved in a same manner as described in the first or fifth embodiment in FIGS. 2 and 11, respectively. The two legs 305 of the plate spring 303 are attached to the two prongs 306 of the tuning fork in first connection points 308a,b. From the tip region of the plate spring 303 a connection part 310, similar to a third leg, leads to the base 307 of the tuning fork. This connection part 310 is fixed to the base 307 of the fork in a further connection point 309 and extends over the whole width of the base 307. In this region of the tuning fork, base optical coupling 313 of a waveguide 311, which is arranged on or in the plate spring 303, with an external device 312 is possible. Such an external device 312 is, for example, a light source, a detector, or light guiding means, such as a laser, a photodiode or an optical fiber. A waveguide 311 in the connection means can, for example, be an oxidized part of a silicon plate spring 303 such as a $SiO_2$ layer. In FIG. 12, the tip is shown as an integral part of the plate spring 303. A tip and waveguide 311, respectively, can also be a separate part that is fixed to the underlying connection part 310 of the connection means. A waveguide can also be a part of or be arranged along a leg in a connection means, for example according to FIG. 11. The pointing direction of the tip attached to or being part of the connection means is not along an axis parallel or perpendicular to the symmetry axis of the connection means, i.e. in the x-or z-direction (a defined angle different from 0° or 90°). It is also possible to have a tip and connection means having an angle not 0° or 90° to a symmetry axis of the tuning fork. In order to be able to scan parallel to a surface these angles might be compensated in some other parts of the actuating device by adding a defined angle between tuning fork and connection means or by having a defined angle between cantilever beam and surface normal.

The present invention is not limited to the embodiments shown in the drawings. The specialist with knowledge of the present invention has further possibilities for the design of such actuating and sensing devices at his or her disposal. Especially, the shown shapes and symmetry of connection means or the symmetric position of a tip on connection means are only preferred embodiments of the present invention. In the drawings the tip, connection means, and tuning fork are in general perpendicular or parallel to one another in all possible combinations. Also a waveguide or any other connection part from the base of a tuning fork to a tip is preferably guided in a way that the symmetry of the connection means or the whole tuning fork is preserved. However, the embodiments are not limited to this. It is also possible to attach a tip rigidly to two prongs of a fork-like device. While loosing some advantages of the resonance characteristics of the tuning fork, there are still the advantages of a symmetric probing set up and of not needing an external detection system.

The invention claimed is:

1. An actuating and sensing device for scanning probe microscopes, said actuating and sensing device including a tuning fork (21,31,41,61,81,91,201) containing two prongs (46,76,106,206,306) and connection means (23,33,43,63,83, 93,103) with a probing tip (22,32,42,62,82,202,302), wherein the tip (22,32,42,62,82,202,302) is connected to both of said two prongs (46,76,106,206,306) of the tuning fork (21,31,41,61,81,91,201) via the connection means (23, 33,43,63,83,93,103, 203,303).

2. The actuating and sensing device as defined in claim 1, wherein the connection means (23,33,83,103) has a shape with a defined axis that is essentially a symmetry axis of said connection means (23,33,83,103,203,303), wherein said symmetry axis is arranged on or parallel to a symmetry axis of the tuning fork (21,31,81,201).

3. The actuating and sensing device as defined in claim 2, wherein a pointing direction of the tip (62,82,202,302) is parallel to the symmetry axis of the connection means (63,83).

4. The actuating and sensing device as defined in claim 2, wherein a pointing direction of the tip (22,32,42,202,302) is perpendicular to the symmetry axis of the connection means (23,33,43,103).

5. The actuating and sensing device as defined in claim 1, wherein the connection means (43,63) has a shape with a defined axis that is essentially a symmetry axis of said connection means (43,63), wherein said symmetry axis is perpendicular to the symmetry axis of the tuning fork (41,61).

6. The actuating and sensing device as defined in claim 5, further comprising a further connection point (209,309) connecting the probing tip (22,32,42,202,302) to the tuning fork (21,31,41,61,81,91,201) via the connection means (23, 33,43,63,83,93,103,203,303) in the further connection point, said further connection point being in addition to said connection of the tip to the two prongs (46,76,106,206,306) of the tuning fork (21,31,41,61,81,91,201).

7. The actuating and sensing device as defined in claim 6, wherein said further connection point (209,309) is used as a coupling means for coupling an external signal into or out of the actuating and sensing device, said external signal being independent of a driving signal of the tuning fork (21,31, 41,61,81,91,201).

8. The actuating and sensing device as defined in claim 5, wherein a pointing direction of the tip (62,82,202,302) is parallel to the symmetry axis of the connection means (63,83).

9. The actuating and sensing device as defined in claim 5, wherein a pointing direction of the tip (22,32,42,202,302) is perpendicular to the symmetry axis of the connection means (23,33,43,103).

10. The actuating and sensing device as defined in claim 1, further comprising a further connection point (209,309) connecting the probing tip (22,32,42,202,302) to the tuning fork (21,31,41,61,81,91,201) via the connection means (23, 33,43,63,83,93,103,203,303) in the further connection point, said further connection point being in addition to said connection of the tip to the two prongs (46,76,106,206,306) of the tuning fork (21,31,41,61,81,91,201).

11. The actuating and sensing device as defined in claim 10, wherein said further connection point (209,309) is used as a coupling means for coupling an external signal into or out of the actuating and sensing device, said external signal being independent of a driving signal of the tuning fork (21,31,41,61,81,91,201).

12. The actuating and sensing device as defined in claim 1, wherein movements of the tuning fork (21,31,41,61,81, 91,201) are transformed into movements of the tip (22,32, 42,62,82,202,302) with said connection means (23,33,43, 63,83,93,103,203,303).

13. The actuating and sensing device as defined in claim 12, wherein a plane of movement of the prongs (46,76,106, 206,306) of the tuning fork (21,31,41,61,81,91,201) is different than a plane of movement of the tip (22,32,42,62,82, 202,302).

14. The actuating and sensing device as defined claim 1, wherein said connection means (23,33,43,63,83,93,103,203, 303) are symmetric with respect to a symmetry axis or symmetry plane of said connection means (23,33,43,63,83, 93,103,203,303).

15. The actuating and sensing device as defined in claim 14, wherein said connection means (23,33,43,63,83,93,103) are U- or V-shaped.

16. The actuating and sensing device as defined in claim 1, wherein said connection means (23,33,43,63,83,93,103, 203,303) and tip (22,32,42,62,82,202,302) contain the same material.

17. The actuating and sensing device as defined in claim 1, wherein said connection means are spring means (23,33, 43,63,83,93,103,203,303).

18. The actuating and sensing device as defined in claim 17, wherein the spring means are selected from the group consisting of a plate spring, a leaf spring (23,43,103,203, 303), an elastic wire, and a strip of solid material (63,83).

19. The actuating and sensing device as defined in claim 18, wherein the plate spring (23,43,103) has a total length of 150–650 μm and two legs (25,35) with a width (w) of 30–100 μm, and wherein each of said legs (25,35) are attached to a prong (46,106) of the tuning fork (21,31,41, 91).

* * * * *